(12) United States Patent
Pollock

(10) Patent No.: US 12,539,724 B2
(45) Date of Patent: Feb. 3, 2026

(54) VEHICLE FRAME SYSTEM FOR A VEHICLE

(71) Applicant: Westinghouse Air Brake Technologies Corporation, Pittsburgh, PA (US)

(72) Inventor: Jarred Michael Pollock, Berwick, PA (US)

(73) Assignee: Westinghouse Air Brake Technologies Corporation, Pittsburgh, PA (US)

( * ) Notice: Subject to any disclaimer, the term of this patent is extended or adjusted under 35 U.S.C. 154(b) by 889 days.

(21) Appl. No.: 17/731,394

(22) Filed: Apr. 28, 2022

(65) Prior Publication Data
US 2022/0355635 A1   Nov. 10, 2022

Related U.S. Application Data

(60) Provisional application No. 63/185,183, filed on May 6, 2021.

(51) Int. Cl.
*B60F 1/04*     (2006.01)
*B60F 1/02*     (2006.01)

(52) U.S. Cl.
CPC ............ *B60F 1/04* (2013.01); *B60F 1/02* (2013.01); *B60F 1/043* (2013.01)

(58) Field of Classification Search
CPC ...... B60F 1/00; B60F 1/02; B60F 1/04; B60F 1/043; B60F 1/046
See application file for complete search history.

(56) References Cited

U.S. PATENT DOCUMENTS

| | | | | |
|---|---|---|---|---|
| 2,543,154 | A * | 2/1951 | Cox | F16C 23/04 384/276 |
| 3,980,025 | A * | 9/1976 | Olson, Sr. | B60F 1/043 105/72.2 |
| 4,534,297 | A * | 8/1985 | Johnson, Sr. | B61D 15/00 105/72.2 |
| 6,298,792 | B1 * | 10/2001 | Jackson, Jr. | B60F 1/043 105/215.1 |
| 8,714,293 | B2 * | 5/2014 | Despres-Nadeau | B60K 17/22 464/139 |
| 10,773,562 | B2 * | 9/2020 | Mascola | B60F 1/04 |
| 11,077,731 | B2 * | 8/2021 | Hazrati-Ashtiani | B60F 1/043 |
| 2017/0151847 | A1 * | 6/2017 | Letukas | B60F 1/04 |
| 2019/0352728 | A1 * | 11/2019 | Savushkin | C21D 1/06 |

FOREIGN PATENT DOCUMENTS

| | | | | |
|---|---|---|---|---|
| CN | 108032691 A | * | 5/2018 | .............. B60F 1/00 |
| CN | 110281969 A | * | 9/2019 | .............. B61F 19/04 |
| FR | 2838675 A1 | * | 10/2003 | .............. B60F 1/046 |

* cited by examiner

*Primary Examiner* — Cheng Lin
(74) *Attorney, Agent, or Firm* — K&L Gates LLP

(57) ABSTRACT

A vehicle frame system includes a lower cross frame assembly that is coupled with an axle and includes a frame bar extending between a first end and a second end along a first axis. The frame bar includes a first external circumferential surface extending along at least a portion of the first axis. A first sleeve is configured to be disposed over the first external circumferential surface. A first internal surface of the first sleeve is operably coupled with the first external circumferential surface of the frame bar. The first sleeve is configured for a temperature of the first sleeve to be controlled to change one or more characteristics of the first sleeve. The first sleeve is prohibited from moving relative to the frame bar responsive to changing the one or more characteristics of the first sleeve.

19 Claims, 9 Drawing Sheets

VEHICLE FRAME SYSTEM FOR A VEHICLE

CROSS-REFERENCE TO RELATED APPLICATIONS

This application claims priority to U.S. Provisional Application No. 63/185,183 (filed 6 May 2021), the entire disclosure of which is incorporated herein by reference.

BACKGROUND

Technical Field

The subject matter described herein relates to railgear frame systems of hi-rail vehicles and related methods.

Discussion of Art

A railgear system may be coupled with a conventional roadway vehicle to allow the roadway vehicle to traverse either a railway track or a non-rail route. For example, the railgear allows the vehicle to convert between road use and rail use. Current railgear systems may be used with light or heavy duty hi-rail vehicles, such as passenger vehicles, mining vehicles, buses, agricultural equipment, heavy haul vehicles, or other off-highway vehicles. Conventionally, a railgear system may be manufactured out of steel components and may include a hydraulic cylinder to control movement of the railgear system. However, the weight of the railgear system that is added to the vehicle reduces a payload that the vehicle may carry or operate with. For example, a light duty vehicle that includes a railgear system may be limited in a remaining payload that the vehicle may carry before the vehicle is overloaded.

It may be desirable to have a railgear system and method that differs from those currently available.

BRIEF DESCRIPTION

In one or more embodiments, a vehicle frame system includes a lower cross frame assembly that is coupled with an axle and includes a frame bar extending between a first end and a second end along a first axis. The frame bar includes a first external circumferential surface extending along at least a portion of the first axis. A first sleeve is configured to be disposed over the first external circumferential surface. A first internal surface of the first sleeve is operably coupled with the first external circumferential surface of the frame bar. The first sleeve is configured for a temperature of the first sleeve to be controlled to change one or more characteristics of the first sleeve. The first sleeve is prohibited from moving relative to the frame bar responsive to changing the one or more characteristics of the first sleeve.

In one or more embodiments, a vehicle frame system includes an axle extending between a first end and a second end, a first guide wheel operably coupled with the first end of the axle, and a second guide wheel operably coupled with the second end of the axle. A lower cross frame assembly is operably coupled with the axle and includes a frame bar extending between a first end and a second end of the frame bar along a first axis. A first sleeve and a second sleeve are respectively disposed over the first end and the second end of the frame bar. A first guide assembly is operably coupled with the first end of the frame bar and a second guide assembly is operably coupled with the second end of the frame bar. Each of the first and second guide assemblies respectively comprises a guide tube extending between a first end and a second end along a second axis, and a third sleeve disposed within a portion of the guide tube. The first and second sleeves are interference fit with the frame bar and the third sleeve is interference fit within the guide tube so that the first and second sleeves are prohibited from moving relative to the frame bar and the third sleeve is prohibited from moving relative to the guide tube.

In one or more embodiments, a railgear for a hi-rail vehicle includes an axle extending between a first end and a second end. A first guide wheel is operably coupled with the first end of the axle, and a second guide wheel is operably coupled with the second end of the axle. A lower cross frame assembly is operably coupled with the axle and includes a frame bar extending between a first end and a second end along a first axis. A first sleeve is disposed over the first end of the frame bar and a second sleeve is disposed over the second end of the frame bar. An actuator device is operably coupled with the lower cross frame assembly and controls movement of the axle between different states of the axle relative to the lower cross frame assembly. The railgear includes first and second guide assemblies operably coupled with the first and second ends of the frame bar. Each of the first and second guide assemblies respectively comprises a guide tube extending between a first end and a second end along a second axis, and a third sleeve disposed within a portion of the guide tube. The first sleeve and the second sleeve are interference fit on to the first and second ends of the frame bar, respectively, and the third sleeve of each of the first and second guide assemblies is interference fit within the guide tube, so that the first and second sleeves and the third sleeve are prohibited from moving relative to the frame bar and the guide tube, respectively.

BRIEF DESCRIPTION OF THE DRAWINGS

The inventive subject matter may be understood from reading the following description of non-limiting embodiments, with reference to the attached drawings, wherein below.

DETAILED DESCRIPTION

Figure 1:
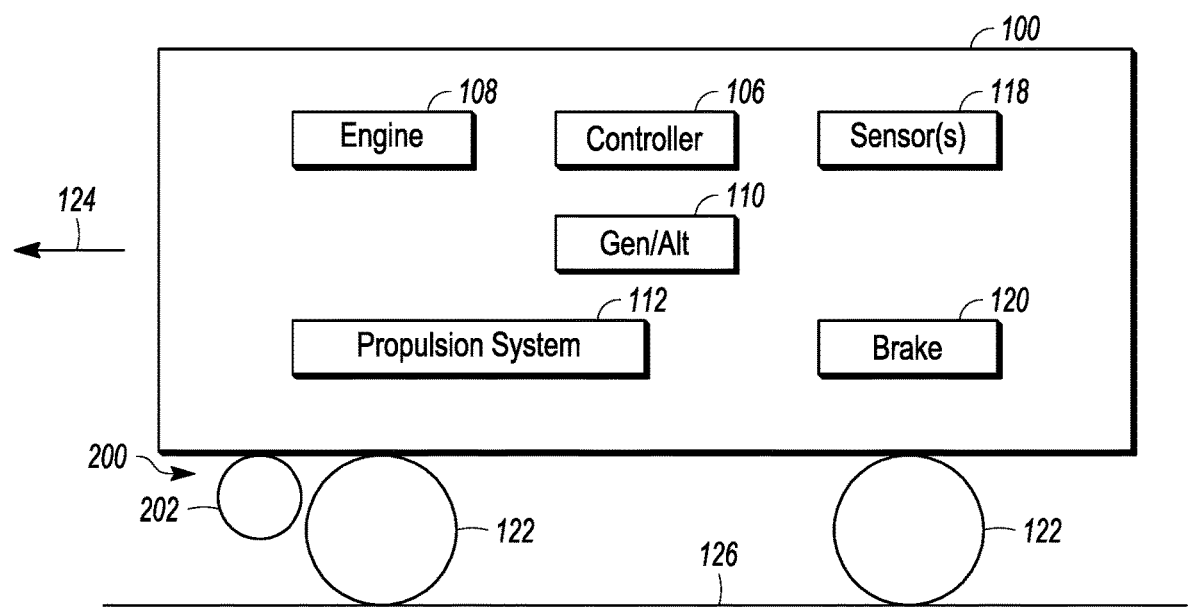
FIG. 1 illustrates one example of a hybrid vehicle system in accordance with one embodiment.

Embodiments of the subject matter described herein relate to a vehicle frame system and method of operation. The vehicle frame system includes one or more axles that extend between a first end and a second end, with a first guide wheel attached to the first end of each axle, and a second guide wheel attached to the second end of each axle. The axle(s) may be operably coupled with a lower cross frame assembly that includes a frame bar extending between first and second ends along a first axis. A first sleeve and a second sleeve are disposed over the first end and the second end of the frame bar, respectively. The frame bar and the first and second sleeves may be manufactured of the same (or similar) or different materials. For example, the frame bar may be manufactured of an aluminum alloy, and the first and second sleeves may be manufactured of a steel alloy. Optionally, the frame bar and/or the sleeves may be manufactured of a magnesium alloy, a titanium alloy, a plastic material, a zinc alloy, a brass alloy, a bronze alloy, a tin alloy, an engineered material, or the like. In one or more embodiments, the frame bar and the sleeves may be made from metal alloys, but the metal alloy of the frame bar may be lighter in weight than the metal alloy of the sleeves.

The sleeves may be disposed at positions along the length of the frame bar that interfere with other components that may be manufactured of a material other than aluminum. For example, the sleeves may be manufactured of similar materials to the other components, and may be used to control an amount of wear between the dissimilar materials of the frame bar (e.g., the aluminum alloy) and the other component (e.g., non-aluminum material).

The vehicle frame system also includes a first guide assembly coupled with the first end of the frame bar, and a second guide assembly coupled with the second end of the frame bar. Each of the first and second guide assemblies includes a guide tube extending along a second axis, and a third sleeve disposed within a portion of the guide tube. The guide tubes and the third sleeves may be manufactured of different materials. For example, the guide tubes may be manufactured of an aluminum alloy, and the third sleeves may be manufactured of a steel alloy. Optionally, the guide tubes may be manufactured of a magnesium alloy, a titanium alloy, an engineered material, a plastic material, or the like, and the third sleeves may be manufactured of a zinc alloy, a brass alloy, a bronze alloy, a tin alloy, an engineered material, or the like. In one or more embodiments, the guide tubes and the third sleeves may be made from metal alloys, but the metal alloy of the guide tubes may be lighter in weight than the metal alloy of the third sleeves. The third sleeves may be disposed at positions within the guide tubes that interfere with or are in contact with another component that may be manufactured of a material other than aluminum. For example, the third sleeves may be manufactured of similar materials to the other components, and may be used to control an amount of wear between the dissimilar materials of the guide tubes (e.g., the aluminum alloy) and the other component (e.g., non-aluminum material).

The first and second sleeves can be interference fit with the frame bar and the third sleeve can be interference fit within the guide tube so that the first and second sleeves are prohibited from moving relative to the frame bar, and the third sleeve is prohibited from moving relative to the guide tube. In order to assemble the sleeves with the frame bar and with the guide tubes, respectively, a temperature of the sleeves may be controlled to change one or more characteristics of the sleeves. For example, the temperature of the sleeves may be increased to change the characteristics of the material of the sleeves to allow or enable the sleeves to be moved to assembled positions, and the temperature of the sleeves may be subsequently decreased to again change the characteristics of the sleeves to produce the interference fit between the sleeves and the frame bar and guide tubes, respectively. For example, the interference fit of the sleeves with the frame bar and the guide tubes may be temperature shrink fits that are created by heating the sleeves to increase the sizes of the sleeves such that the sleeves can be placed onto the frame bar, or decrease the sizes of the sleeves such that the sleeves can be placed into the guide tubes. The sleeves then may be cooled to shrink or expand the sleeves and form the interference fits. In one embodiment, the frame bar cannot fit inside the sleeves and the sleeves cannot fit inside the guide tubes without first heating and changing the characteristics of the sleeves. The interference fits between the sleeves and the frame bar and guide tubes prohibit the sleeves from moving relative to the frame bar and guide tubes, respectively.

In one or more embodiments, the vehicle frame system may be referred to as a railgear, railgear system, railgear guide assembly, or the like. The vehicle frame system may be installed onto or operably coupled with a conventional roadway vehicle to enable the vehicle to traverse either a railway track or a non-rail route. For example, the railgear vehicle frame system allows the vehicle to convert between road use and rail use. In one or more embodiments, the vehicle frame system may include a front railgear unit that may be disposed at a front end of the vehicle, and a rear railgear unit that may be disposed at a rear end of the vehicle. Each of the front and rear railgear units may include one or more actuator devices (e.g., hydraulic cylinder, electric actuators, or the like) that may control positioning of each of the front and rear railgear units between different states. The vehicle system may move along rails of the railway track when the vehicle frame system (e.g., the front and rear railgear units) is in a first state, and the vehicle system may move along the non-railway route when the vehicle frame system (e.g., the front and rear railgear units) is in a second state. In one or more embodiments, the vehicle system may be referred to as a hybrid vehicle system, a hi-rail vehicle, or the like. The vehicle frame system may include components that are manufactured of different materials to control a weight of the vehicle frame system. For example, some components of the vehicle frame system may be manufactured of steel alloys, and other components may be manufactured of aluminum alloys. Optionally, one or more components may be manufactured of any other metallic alloys, engineered materials, plastics, or the like.

FIG. 1 illustrates a vehicle system 100 in accordance with one embodiment. The vehicle system may be a car, or other passenger vehicle, a mining vehicle, a bus, agricultural equipment, a heavy haul vehicle, or another off-highway vehicle. The vehicle system includes a controller 106 that represents hardware circuitry having and/or connected with one or more processors, such as one or more microprocessors, field programmable gate arrays, integrated circuits, and/or the like. In one embodiment, the controller can represent an engine control unit. The controller communicates with an engine 108 of the vehicle system. The engine can be a fuel-consuming engine, such as a diesel engine. Not all embodiments of the inventive subject matter, however, are limited to diesel engines. The engine can represent another type of engine that consumes fuel other than diesel fuel.

The engine consumes fuel to perform work, such as rotating a shaft joined to a generator or alternator 110 ("Gen/Alt" in FIG. 1), which causes the generator or alternator to output electric current. This current can be stored or provided to one or more powered components of the vehicle system, such as propulsion system 112 and/or an auxiliary system (not shown). The propulsion system can represent one or more motors that propel the powered system (e.g., traction motors) using electric current output by the generator or alternator. The propulsion system may include plural wheels 122 that are controlled by the propulsion system to move the vehicle system along a route 126 in a direction of movement 124 of the vehicle system. In the side view illustrated embodiment of FIG. 1, two wheels are illustrated, and are operably coupled with two corresponding wheels disposed on the other side of the vehicle system. The vehicle system may include a brake 120 or brake system that may be controlled to control movement of the vehicle system to slow or stop movement of the vehicle system. The brake can include air brakes, friction brakes, motors (e.g., used for dynamic and/or regenerative braking), or the like.

The auxiliary system can represent one or more other loads that consume at least some of this current, but not for propulsion of the powered system. For example, the auxiliary system can represent motors (e.g., hydraulic and/or linear motors that control movement of a vehicle frame system), fans (e.g., blowers that cool parts of the propulsion system, blowers that cool braking resistors, pumps that force coolant to cool the engine or other components, etc.), heating and/or cooling systems that heat or cool an operator cab of the vehicle system, or the like.

One or more sensors 118 of the vehicle system may sense characteristics of operation of the vehicle system and/or environment, and output signals (e.g., wireless signals and/or signals that are conducted via one or more conductive pathways such as wires, cables, buses, etc.). Optionally, the one or more sensors may sense characteristics of various systems of the vehicle system, such as positions of hydraulic and/or linear motors of the auxiliary system, characteristics and/or changes in characteristics of the route along which the vehicle system is moving, or the like. As described herein, the controller may receive these characteristics to monitor the operation and/or environment of the vehicle system. using this information, the controller can automatically change one or more operations of the vehicle system, such as, but not limited to, an operating speed of the engine, a brake settings, or the like. The number of each of the components shown in FIG. 1 is used as one example. For example, multiples of the engine, the controller, the sensor (s), the generator, the alternator, and/or the propulsion system may be provided.

The vehicle system includes a vehicle frame system 200. In the illustrated embodiment of FIG. 1, the vehicle frame system includes a first guide wheel 202 disposed on a first side or a first end of an axle (not shown). Additionally, the vehicle frame system includes a second guide wheel (not shown) disposed on a second side or second end of the axle. The vehicle frame system is configured to move to different states in one or more directions relative to the vehicle system. Movement of the vehicle frame system includes at least movement of the first and second guide wheels toward or away from the route. The first and second guide wheels may move toward the route to contact the route when the hybrid vehicle system is configured to operate as a rail vehicle. Alternatively, the first and second guide wheels may move away from the route when the hybrid vehicle system is configured to operate as a non-rail vehicle. For example, the axle of the vehicle frame system may move between a first state such that the vehicle system can operate as a rail vehicle and the first and second guide wheels are in contact with the route, and a second state (as illustrated in FIG. 1) such that the vehicle system can operate as a non-rail vehicle and the first and second guide wheels are not in contact with the route.

In the illustrated embodiment of FIG. 1, the vehicle system includes a first vehicle frame system (e.g., the front railgear unit) disposed at a first location of the vehicle system. Optionally, the vehicle system may include a second vehicle frame system (not shown, such as a rear railgear unit) disposed at another location of the vehicle system. For example, the first vehicle frame system may provide the first and second guide wheels disposed at a front portion of the vehicle system in the direction of movement of the vehicle system, and the second vehicle frame system may provide third and fourth guide wheels disposed at or proximate a rear portion of the vehicle system. Optionally, the first and second vehicle frame systems may be disposed at any location between a front end and a rear end of the vehicle system. For example, the illustrated embodiment of FIG. 1 indicates the vehicle frame system disposed between front wheels of the vehicle system and the front end of the vehicle system (e.g., in the direction of movement of the vehicle system). Additionally or alternatively, one of the vehicle frame systems may be disposed at a location between the front and rear wheels of the vehicle system, or may be disposed at a location between the rear wheels and the rear end of the vehicle system.

Figure 2:
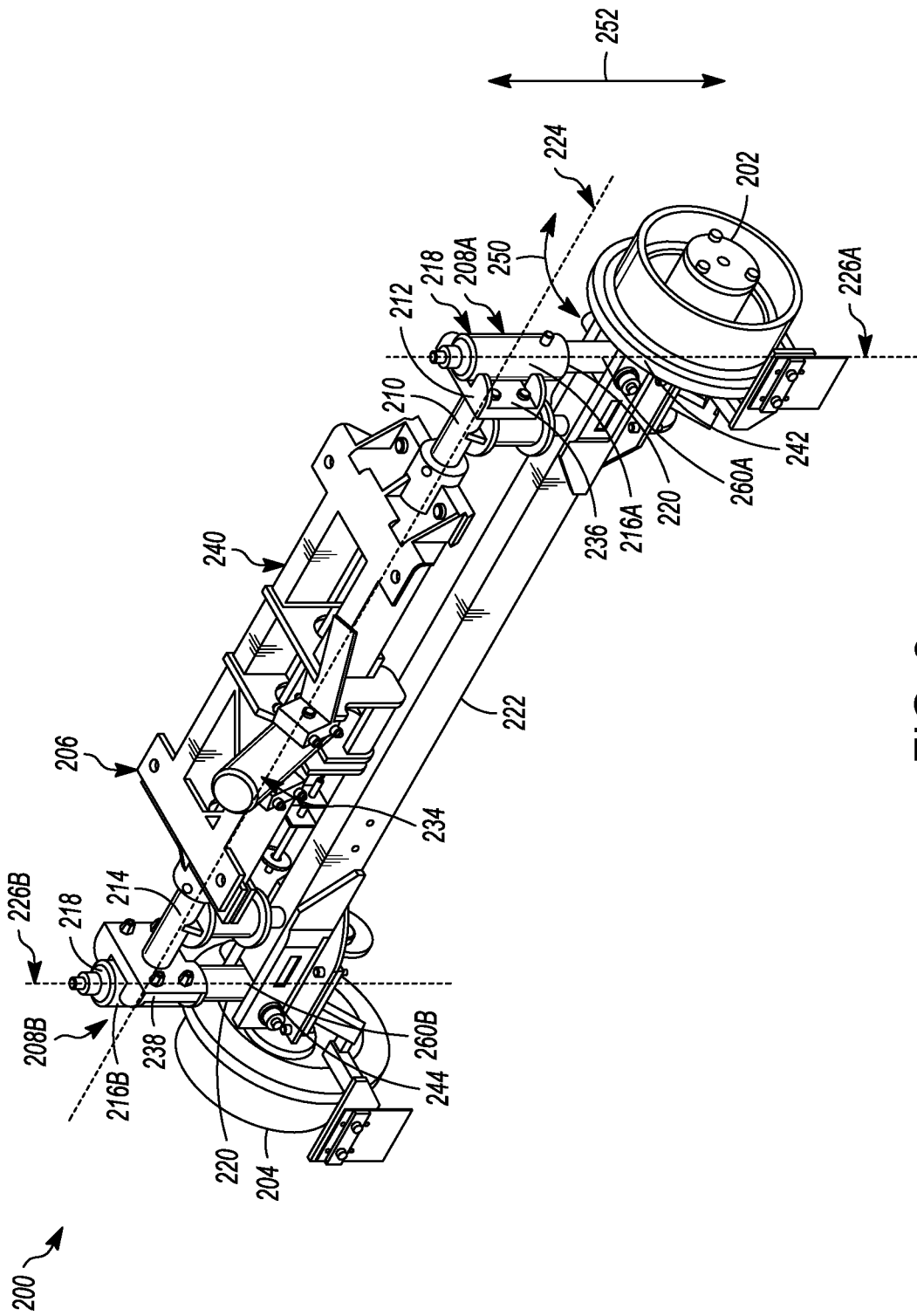
FIG. 2 illustrates a perspective view of a vehicle frame system of the hybrid vehicle system illustrated in FIG. 1.
Figure 3:
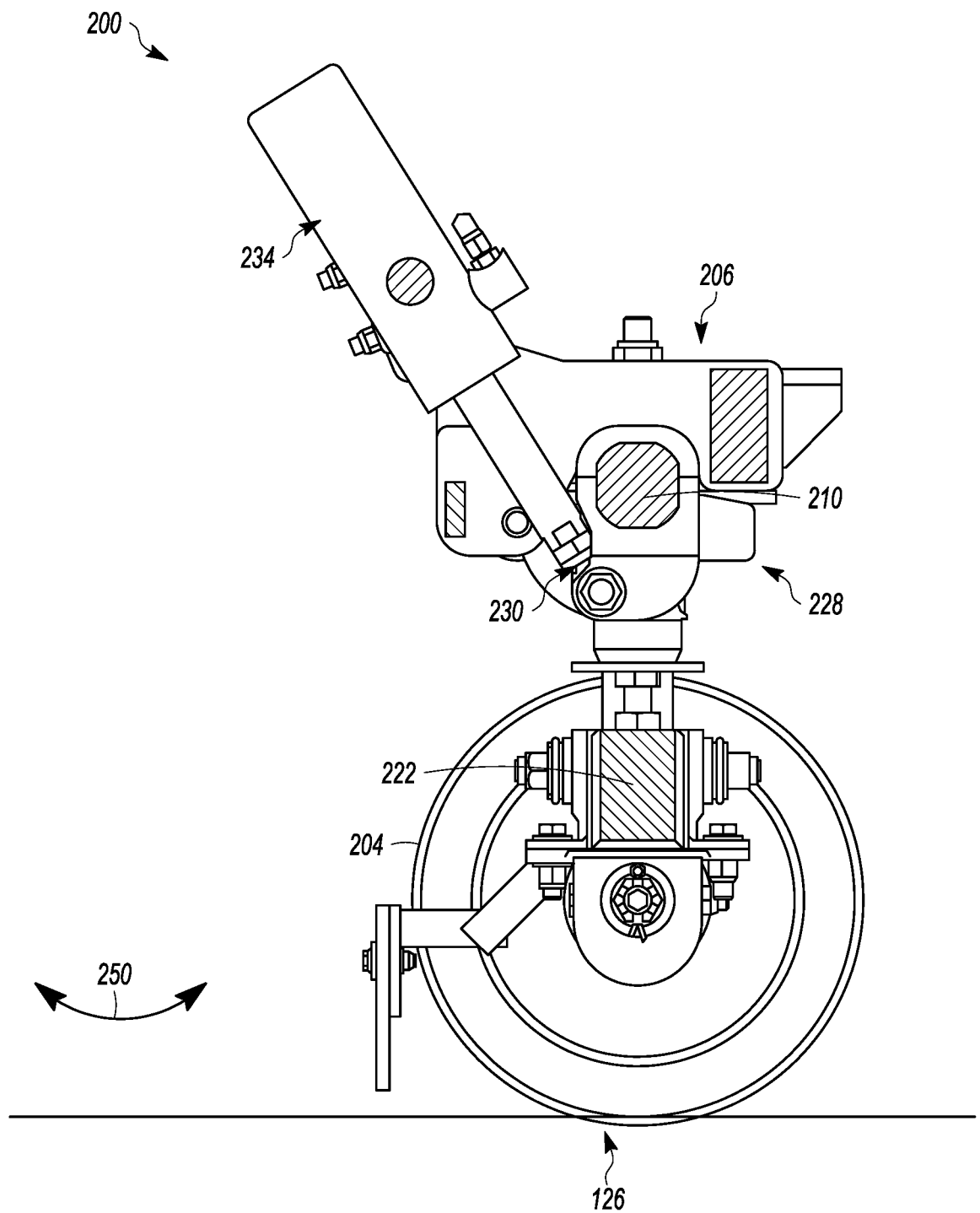
FIG. 3 illustrates a section view of the vehicle frame system shown in FIG. 2.

FIG. 2 illustrates a perspective view of the vehicle frame system 200 in accordance with one embodiment. FIG. 3 illustrates a section view of the vehicle frame system shown in FIG. 2 in accordance with one embodiment. The vehicle frame system illustrated in FIGS. 2 and 3 may represent a front railgear unit and/or a rear railgear unit. The vehicle frame system includes an axle 222 that extends between a first end 242 and a second end 244. The first guide wheel 202 is operably coupled with the first end of the axle, and the second guide wheel 204 is operably coupled with the second end of the axle.

The vehicle frame system includes an upper cross frame assembly 206 and a lower cross frame assembly 228. A bottom surface of the upper cross frame assembly faces toward and may be operably coupled with a top surface of the lower cross frame assembly. The upper cross frame assembly includes a frame mounting device 240 that is used to operably couple the vehicle frame system with a frame of a vehicle system (not shown). For example, the frame mounting device may couple the vehicle frame system with a bottom side of the vehicle system, or alternatively with another side or surface of the frame of the vehicle system. In the illustrated embodiment, the frame mounting device includes plural mounting holes that may receive fasteners, but alternatively the frame mounting device may be coupled with the frame of the vehicle system by alternative methods such as, but not limited to, welding, or the like.

The lower cross frame assembly includes a frame bar 210 that extends between a first end 212 and a second end 214 along a frame axis or a first axis 224. The lower cross frame assembly includes a first end plate 236 disposed at the first end of the frame bar, and a second end plate 238 disposed at the second end of the frame bar. The first end plate couples the lower cross frame assembly with a first guide assembly 208A, and the second end plate couples the lower cross frame assembly with a second guide assembly 208B. The first and second guide assemblies each include a guide tube 216A, 216B respectively, with each tube extending between first ends 218 and second ends 220 along second axes 226A, 226B, respectively. The guide assemblies also include guide shafts 260A, 260B that extend within a passage of the guide tubes. For example, the guide shaft 260A is disposed within a center passage of the guide tube of the first guide assembly, and the guide shaft 260B is disposed within a center passage of the guide tube of the second guide assembly.

The first guide assembly is operably coupled with the first end of the axle, and the second guide assembly is operably coupled with the second end of the axle. For example, the first and second guide assemblies may move responsive to movement of the axle. In one or more embodiments, the first and second guide assemblies may act or operate as suspensions or suspension guides of the vehicle system. For example, the first and second guide assemblies may provide a spring force to the vehicle system and/or the vehicle frame system. In one or more embodiments, the vehicle frame system may include one or more springs (not shown) or spring devices disposed between the frame bar of the lower cross frame assembly and the axle. For example, the springs or spring devices may provide a spring force between the frame bar and the axle to control movement of the axle relative to the frame bar.

Figure 4:
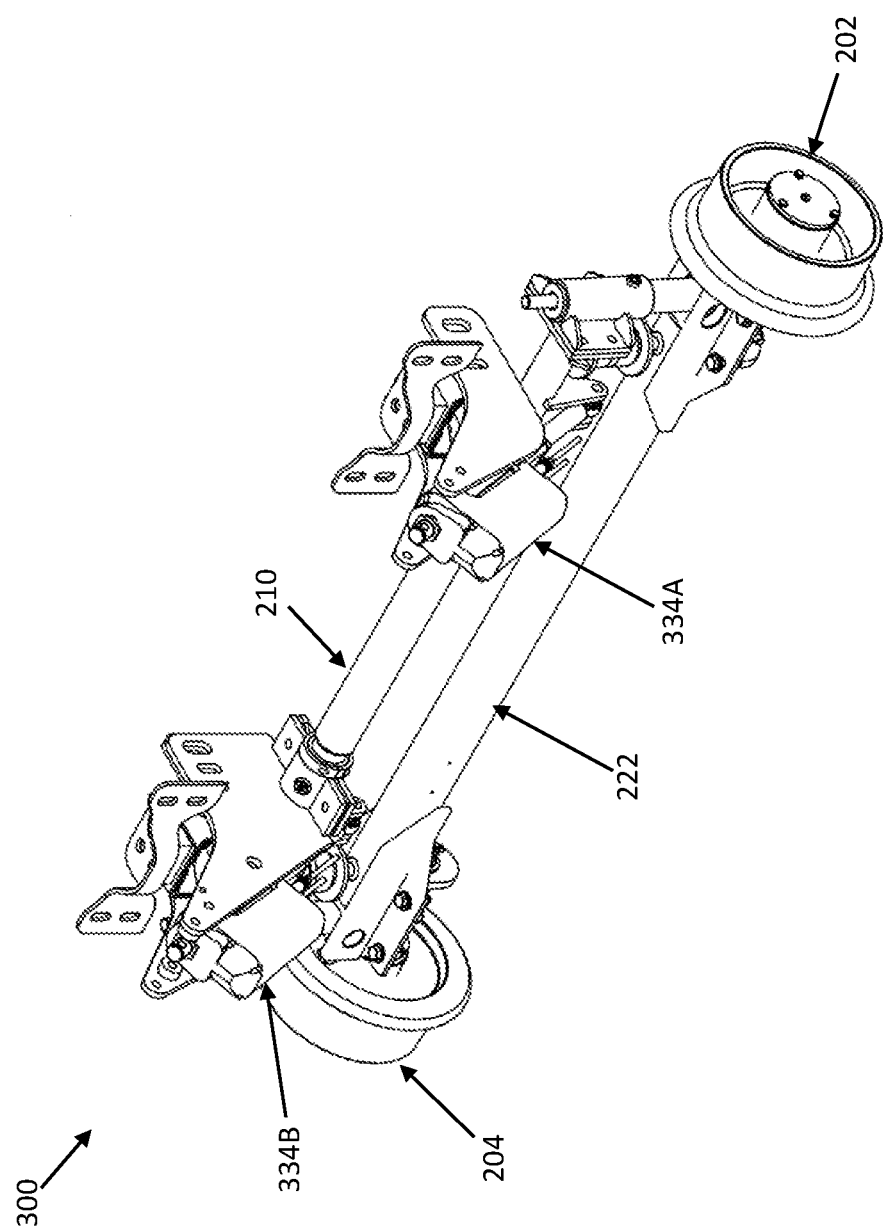
FIG. 4 illustrates a perspective view of a vehicle frame system in accordance with one embodiment.

The vehicle frame system includes at least one actuator device 234. A portion 230 of the actuator device may be operably coupled with the lower cross frame assembly. In the illustrated embodiment, the vehicle frame system includes a single actuator device that is positioned approximately centered between the first and second ends of the frame or first axis. Optionally, the vehicle frame system may include two or more actuator devices, each disposed at a different location between the first and second ends of the frame axis. For example, FIG. 4 illustrates one example of a vehicle frame system 300 in accordance with one embodiment. The vehicle frame system includes the axle 222 that extends between the first and second guide wheels. A first actuator device 334A is coupled with the frame bar 210 proximate to the first guide wheel, and a second actuator device 334B is coupled with the frame bar proximate to the second guide wheel. In one or more embodiments, the first and second actuator devices may be the same devices (e.g., the same type, make, model, or the like), or alternatively may be different devices (e.g., different types, different makes, different models, or the like). In one embodiment, the first and second actuator devices may be specified to generate substantially the same amount of linear force, or alternatively one of the devices may be specified to generate a different amount of linear force or power relative to the other device.

Actuation of the actuator device(s) controls movement of the axle relative to the lower cross frame assembly. For example, actuation of the actuator device moves the axle in a rotational direction 250 (shown in FIG. 2), and rotates the frame bar in the same rotational direction. Rotation of the axle and the frame bar changes a position of the location of the guide wheels. The vehicle frame system may move between different states based on a route along which the vehicle system moves. For example, the actuator device may be controlled to move the guide wheels to one state and toward a position or location away from the route (e.g., such that the guide wheels are not in contact with the route), or the actuator device may be controlled to move the guide wheels to a different state and toward a position or location proximate to the route (e.g., such that the guide wheels are in direct contact with the route).

In one or more embodiments, the actuator device(s) may be a linear actuator device, a hydraulic cylinder actuator device, or the like. The actuator device may be an electric actuator device, such as an electric linear actuator device, and may be controlled via electric energy from the vehicle system. Optionally, the actuator device may include and/or be operably coupled with one or more hydraulic pumps, hoses, a fluid, or the like, to control operation of the actuator device.

In one or more embodiments, the actuator device may include and/or be capable of being coupled with a manual control device, that may allow a user or operator to manually control operation of the one or more actuator devices. As one example, the actuator devices may include a mating component that may be configured to mate with or be coupled with a corresponding mating component of a manual hand crank. The manual hand crank may allow the user or operator to manually control operation of the actuator device, such as in the event of a power failure, mechanical failure (e.g., of the actuator device, of another component of the vehicle frame system, of the vehicle system, or the like), to allow the operator to make adjustments to the positioning of the actuator, or the like. In one embodiment that includes two or more actuator devices, a single manual hand crank may be used to control movement of each actuator device, or a single manual hand crank may control operation of each actuator device (e.g., simultaneously).

Figure 5:
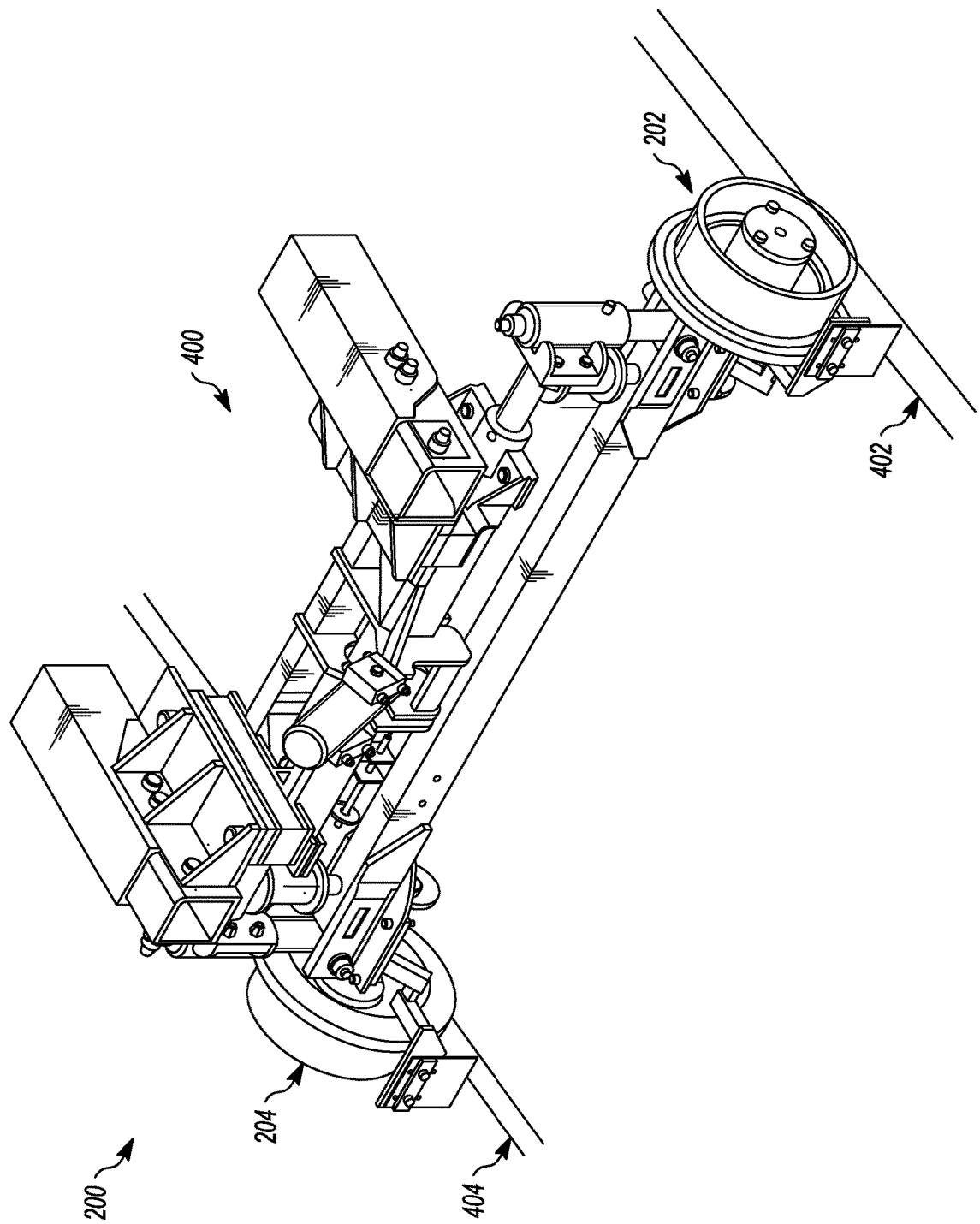
FIG. 5 illustrates a vehicle frame system in a first state in accordance with one embodiment.

FIG. 5 illustrates the vehicle frame system being in a first state 400. The vehicle frame system may be in the first state while the vehicle system moves along a railway track that includes a first rail 402 and a second rail 404. For example, the first and second guide wheels may be in direct contact with the first and second rails, respectively, responsive to the vehicle frame system being in the first state. The first and second guide wheels may be used by the vehicle system to enable the vehicle system to move along a railway track.

Figure 6:
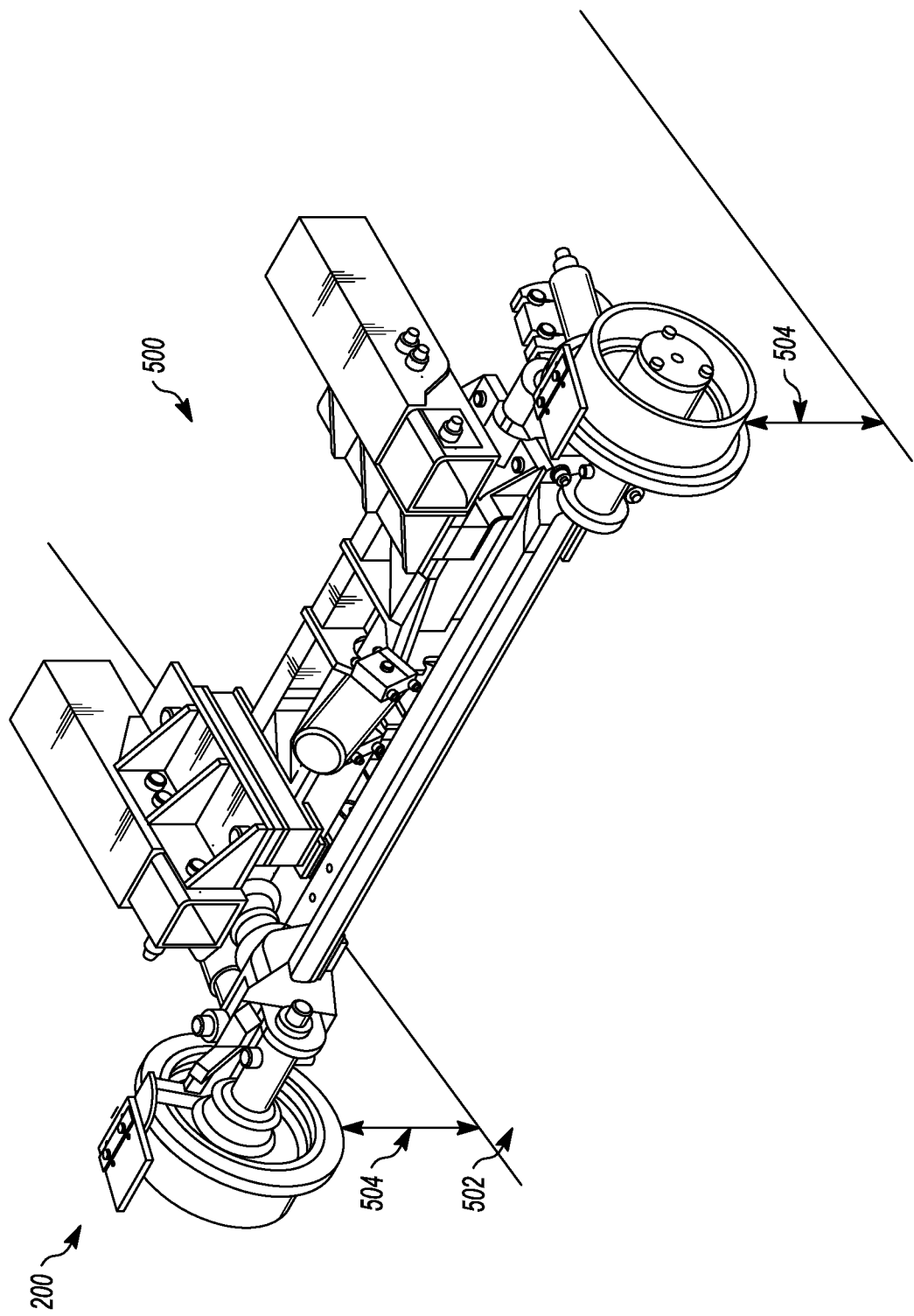
FIG. 6 illustrates a vehicle frame system in a second state in accordance with one embodiment.

Alternatively, FIG. 6 illustrates the vehicle frame system being in a second state 500. The vehicle frame system may be in the second state based on the vehicle system moving along a non-rail route 502. For example, the first and second guide rails are separated from the route by a distance 504 responsive to the vehicle frame system being in the second state. The first and second guide rails are not used by the vehicle system to move along the non-rail route.

With reference to FIGS. 5 and 6, in order to move the vehicle frame system between the first and second states, the actuator device moves between a deployed state or position, and a non-deployed state or position. For example, to move the axle of the vehicle frame system to the first state from the second state, the actuator device is controlled to move to a deployed state, deployed position, extended position, or the like, from a non-deployed state. Moving the actuator device to the deployed state or deployed position causes rotational movement of the frame bar of the lower cross frame assembly in a first rotational direction, and linear movement of the guide shafts of the guide assemblies. Alternatively, to move the axle of the vehicle frame system to the second state from the first state, the actuator device is controlled to move to a non-deployed state, a non-deployed position, a retracted state, or the like, from a deployed state. Moving the actuator device to a retracted state causes rotational movement of the frame bar of the lower cross frame assembly in a second rotational direction that is opposite the first rotational direction, and linear movement of the guide shafts of the guide assemblies.

In one or more embodiments, the controller of the vehicle system may control operation of the actuator device to move the vehicle frame system between the different states. For example, the controller may automatically control movement of the vehicle frame system responsive to the sensor(s) communicating sensor data to the controller that indicates that the vehicle system is moving on a rail or non-rail route.

Optionally, the controller may control movement of the vehicle frame system responsive to an operator of the vehicle system communicating to the controller that the vehicle system is or will be moving onto a railway track and off from a non-rail route. Optionally, a remote controller (not shown) disposed off-board the vehicle system may control movement of the actuator device to move the vehicle frame system between the different states. In one or more embodiments, the vehicle frame system may move between the different states while the vehicle system is moving, or while the vehicle system is stationary.

In one or more embodiments, the vehicle system may include a first vehicle frame system (e.g., a front railgear unit) coupled with a forward axle of the vehicle system, and a second vehicle frame system (e.g., a rear railgear unit) coupled with a rearward axle of the vehicle system. The controller of the vehicle system may independently control operation of the first and second vehicle frame systems. For example, the controller may control the one or more actuators of the first vehicle system to move to a first position of a deployed state, and may independently control the one or more actuators of the second vehicle system to move to a different, second position of a deployed state. Optionally, control of at least one actuator may control operation of the other actuators of the first and/or second vehicle frame system. For example, the controller may control each actuator of the vehicle system with a single control signal.

In one or more embodiments, one or more components of the vehicle frame system may be manufactured of an aluminum alloy, and one or more other components may be manufactured of a steel alloy. For example, one or more of the components of the vehicle frame system may be manufactured of aluminum and not manufactured of steel in order to control a weight of the vehicle frame system. For example, the vehicle frame system that is made up of aluminum components and steel components may have a total weight that is less than a weight of a vehicle frame system manufactured of only steel components. In one or more embodiments, at least the frame bar, the frame mounting device, the first and second end plates, the axle, and the guide assemblies may be manufactured of one or more different aluminum alloys. Optionally, the components may be manufactured of alternative materials that have one or more material properties (e.g., weight, density, hardness, or the like) that are similar to aluminum. Optionally, the components of the vehicle frame system may be manufactured of the same or similar materials. For example, each component of the vehicle frame system may be manufactured of a steel alloy.

The vehicle frame system may include plural different bearings disposed at different locations of movement of the assembly. In one embodiment, the vehicle frame system may include one or more bearings disposed between the frame bar and the frame mounting device. Optionally, the vehicle frame system may include one or more bearings disposed within the guide assemblies to allow movement of the guide shafts within the guide tubes in a linear direction 252 (shown in FIG. 2). The bearings may be manufactured of steel alloys, or the like.

Figure 7:
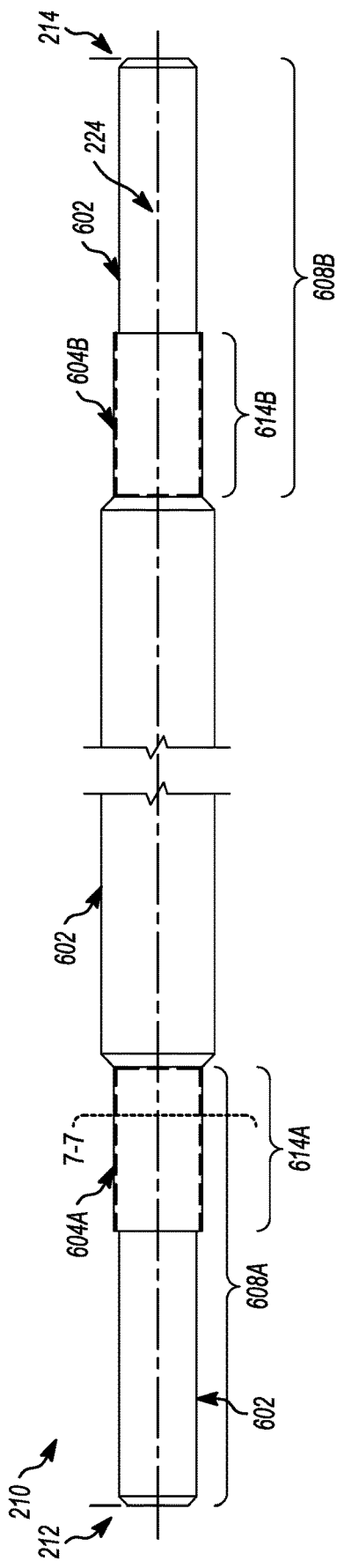
FIG. 7 illustrates a side view of a frame bar of a vehicle frame system in accordance with one embodiment.
Figure 8:
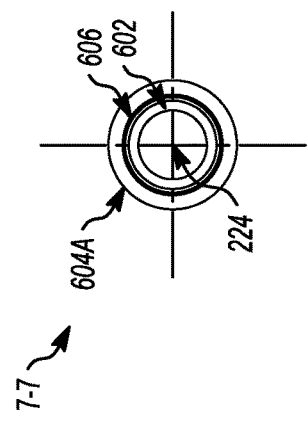
FIG. 8 illustrates a cross-sectional view of the frame bar illustrated in FIG. 7.

In order to control an amount of wear between dissimilar materials, the vehicle frame system may include sleeves disposed at mating locations of the dissimilar materials of the vehicle frame system. For example, FIG. 7 illustrates a side view of the frame bar of the lower cross frame assembly in accordance with one embodiment, and FIG. 8 illustrates a cross-sectional view of the frame bar shown in FIG. 7. The frame bar extends between the first and second ends 212, 214 along the frame axis or the first axis 224. The frame may be manufactured of an aluminum alloy, or the like.

The frame bar includes an external circumferential surface 602 along the length of the frame bar. The lower cross frame assembly includes at least one first sleeve 604A that is disposed over at least a portion of the external circumferential surface of the frame bar. The frame bar may extend a length 608A, and the first sleeve may be disposed over a portion 614A of the length of the frame bar. The first sleeve includes a first internal surface 606 that is operably coupled with the external circumferential surface of the frame bar. In one or more embodiments, the first sleeve may be disposed at a mating location between the frame bar and a bearing (not shown) of the lower cross frame assembly such that the first sleeve is disposed between the bearing and the external circumferential surface of the frame bar. For example, the first sleeve separates the frame bar from the bearing.

In one or more embodiments, the sleeve may be manufactured of a material that is different than a material of the frame bar. For example, the frame bar may be manufactured of an aluminum alloy, and the first sleeve may be manufactured of a steel alloy. Optionally, the frame bar and/or the first sleeve may be manufactured of any alternative metallic alloys, engineered materials, a plastic material, or the like. The materials of the first sleeve and the bearing may be similar, and the similar materials may be different than the material of the frame bar. The first sleeve is configured for a temperature to be controlled to change one or more characteristics of the first sleeve. For example, the temperature of the first sleeve may be increased to a predetermined temperature threshold, and the increase of temperature of the first sleeve may change one or more material properties of the first sleeve. For example, increasing the temperature of the first sleeve increase a cross-sectional size of the first sleeve (e.g., relative to the cross-sectional size of the first sleeve at the decreased or reduced temperature). The increased cross-sectional area of the first sleeve allows the first sleeve to move onto the frame bar. For example, the first sleeve cannot fit onto the frame bar without first increasing or elevating the temperature of the first sleeve.

In order to assemble the first sleeve to the frame bar, the temperature of the first sleeve is controlled to increase a temperature of the first sleeve. Increasing the temperature of the first sleeve changes one or more characteristics of the material of the first sleeve, such as a size of the first sleeve. The increased cross-sectional size of the first sleeve allows the first sleeve to be inserted onto the frame bar. For example, the frame bar may be moved into an increased diameter of a center passage of the first sleeve such that the first internal surface of the first sleeve is operably coupled with a portion of the external circumferential surface of the frame bar.

The temperature of the first sleeve may again be controlled to decrease the temperature of the first sleeve, such as to an ambient temperature. Decreasing the temperature of the first sleeve to the ambient temperature changes the one or more characteristics of the material of the first sleeve. For example, decreasing the temperature of the first sleeve decreases the cross-sectional area of the first sleeve. For example, the frame bar cannot fit inside the first sleeve without first heating the first sleeve. In alternative embodiments, the temperature of the frame bar may be controlled to decrease the temperature of the frame bar to allow the first sleeve to slide onto the frame bar. For example, decreasing the temperature of the frame bar may decrease a cross-sectional size of the frame bar. Decreasing the size of the frame bar may allow the first sleeve to slide onto the frame bar.

Responsive to the change in characteristics of the material of the first sleeve, the first sleeve is prohibited from moving relative to the frame bar. For example, changing the characteristics of the material of the first sleeve provides an interference fit between the first sleeve and the frame bar such that the first sleeve is prohibited from moving relative to the frame bar. The interference fit between the first sleeve and the frame bar may be temperature shrink fit.

In the illustrated embodiment of FIG. 7, the lower cross frame assembly includes a first sleeve 604A disposed proximate the first end of the frame bar, and a second sleeve 604B disposed proximate the second end of the frame bar. For example, the first sleeve is disposed over the external circumferential surface of the first portion 614A of the frame bar, and the second sleeve is disposed over the external circumferential surface of a second portion 614B of the frame bar along a length 608B of the frame bar. The first sleeve is interference fit on to the first end of the frame bar, and the second sleeve is interference fit on to the second end of the frame bar. Optionally, the lower cross frame assembly may include less than two or more than two sleeves disposed at different locations along the length of the frame bar.

Figure 9:
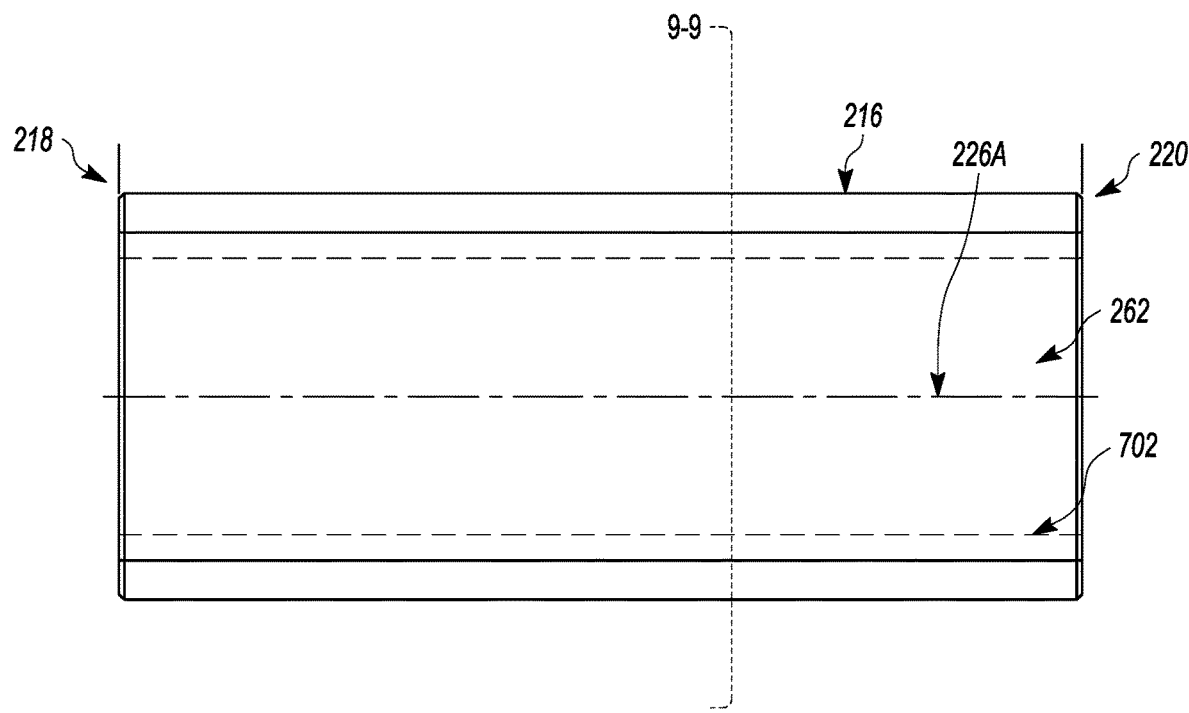
FIG. 9 illustrates a side view of a guide assembly of a vehicle frame system in accordance with one embodiment.
Figure 10:
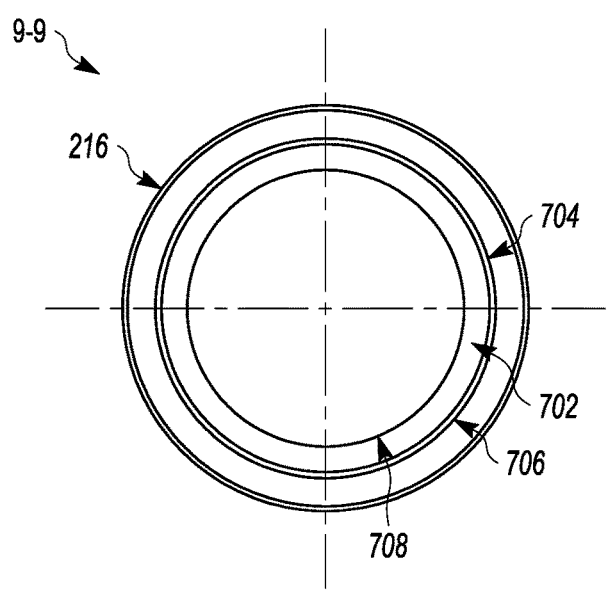
FIG. 10 illustrates a cross-sectional view of the guide assembly illustrated in FIG. 9.

FIG. 9 illustrates a side view of a portion of one of the guide assemblies in accordance with one embodiment. FIG. 10 illustrates a cross-sectional view of the guide assembly. The guide tube 216 extends along the second axis 226A between the first and second ends of the guide tube. The guide tube includes a center passage 262 through which the guide shaft (not shown) extends. The center passage of the guide tube is defined by an interior circumferential surface 704 of the guide tube. The guide assembly includes a sleeve 702 disposed within the at least a portion of the center passage. Referring to FIG. 2, the vehicle frame system may include two guide assemblies, each disposed at an end of the lower cross frame assembly. Each of the first and second guide assemblies are coupled with the frame bar, and each of the first and second guide assemblies include a guide tube and sleeve disposed within a portion of the guide tube. The sleeves of the guide assemblies may be referred to herein as second or third sleeves.

The second sleeve includes an exterior surface 706 that is operably coupled with the internal circumferential surface of the guide tube. For example, the second sleeve is disposed between the guide tube and the guide shaft extending through the center passage of the guide tube such that the second sleeve separates the interior circumferential surface of the guide tube from an exterior surface of the guide shaft. In the illustrated embodiment of FIG. 9, the second sleeve extends substantially between the first and second ends of the guide tube, but alternatively may extend a length that is greater or less than a length of the guide tube.

In one or more embodiments, the second sleeve may be manufactured of a material that is different than a material of the guide tube. For example, the guide tube may be manufactured of an aluminum alloy, a magnesium alloy, a titanium alloy, or the like, and the second sleeve (and optionally the guide shaft) may be manufactured of a steel alloy, a brass alloy, a bronze alloy, a tin alloy, or the like. Optionally, the guide tube and/or the second sleeve may be manufactured out of any alternative materials such as, but not limited to, other metallic alloys, engineered materials, other plastic materials, or the like. For example, the guide tube and the second sleeve may both be manufactured of metals, but the metal material of the guide tubes may have a weight or density that is less than a weight or density of the metal material of the second sleeve.

Like the first sleeve of the lower cross frame assembly, a temperature of the second sleeve is controlled in order to change one or more characteristics of the second sleeve. Unlike the first sleeve of the lower cross frame assembly, the temperature of the second sleeve may be decreased to change the one or more characteristics of the material of the second sleeve and to assemble the second sleeve inside the guide tube. For example, the temperature of the second sleeve may be decreased to a predetermined temperature threshold, and the decrease of temperature of the second sleeve may change one or more properties of the second sleeve. For example, decreasing the temperature of the second sleeve decreases a cross-sectional area of the second sleeve (e.g., relative to the cross-sectional area of the second sleeve at the increased or elevated temperature). The decreased cross-sectional area or size of the second sleeve allows the second sleeve to be inserted into the guide tube. For example, the second sleeve cannot fit inside the guide tube without first cooling or reducing the temperature of the second sleeve.

In order to assemble the second sleeve to the guide tube, the temperature of the second sleeve is controlled to decrease the temperature of the second sleeve to change one or more characteristics of the material of the second sleeve, such as a size of the second sleeve. While the second sleeve is at the decreased or reduced temperature, the second sleeve is positioned within a portion of the guide tube such that the exterior surface of the second sleeve is operably coupled with the internal circumferential surface of the guide tube. After or subsequent to the second sleeve being positioned within the guide tube, the temperature of the second sleeve is controlled to increase to a higher temperature, such as to an ambient temperature. Increasing the temperature of the second sleeve to the ambient temperature changes the one or more characteristics of the second sleeve. For example, increasing the temperature of the material of the second sleeve may increase the cross-sectional size of the second sleeve.

Responsive to the change in characteristics of the material of the second sleeve, the second sleeve is prohibited from moving relative to the guide tube. For example, increasing the cross-sectional area of the second sleeve after the second sleeve is inserted into the guide tube by increasing the temperature of the second sleeve provides an interference fit between the second sleeve and the guide tube such that the second sleeve is prohibited from moving relative to the guide tube. In one embodiment, the interference fit between the second sleeve and the guide tube may be temperature fit or a temperature shrink fit. Alternatively, the temperature of the guide tube may be controlled to increase the temperature to allow the second sleeve to be positioned inside the guide tube with an interference fit between the second sleeve and the guide tube. For example, increasing the temperature of the guide tube may increase a cross-sectional size of the guide tube. Increasing the size of the guide tube may allow the second sleeve to be inserted into the guide tube.

In one or more embodiments, the sleeves may be coupled with the frame bar and/or guide tubes by alternative coupling methods. For example, the sleeves may include interference fits with the frame bar and guide tubes, and the vehicle frame system may include additional fastener devices to maintain the assembled positions of the sleeves relative to the guide tubes (e.g., screws, mating features, or the like). Optionally, the sleeves may include threads and may be threaded into and/or onto corresponding threads of the frame bar and/or guide tubes.

Figure 11:
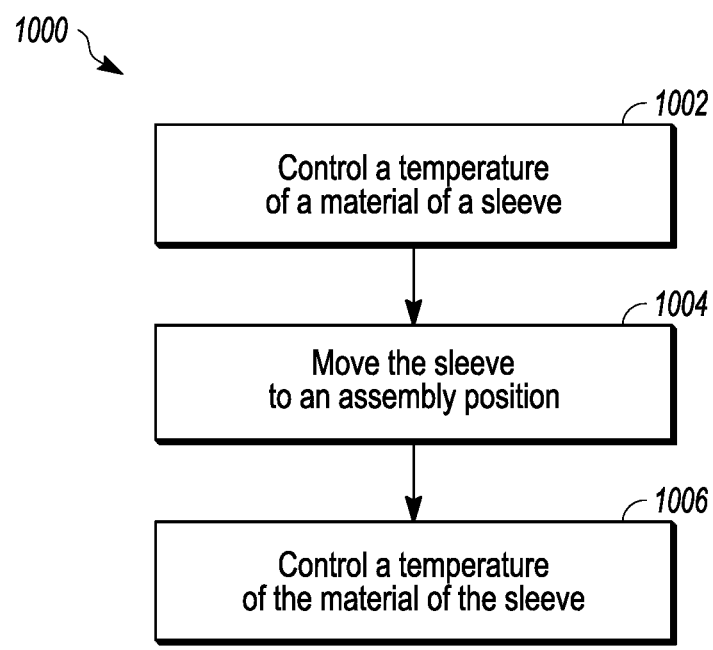
FIG. 11 illustrates a flowchart of a method of assembling a vehicle frame system in accordance with one embodiment.

FIG. 11 illustrates a flowchart 1000 of a method of assembling a vehicle frame system in accordance with one embodiment. The vehicle frame system may be referred to as a railgear or railgear system for a hi-rail vehicle. The vehicle frame system may move between different states to enable the hybrid hi-rail vehicle to operate as a rail vehicle or to enable the hybrid hi-rail vehicle to operate as a non-rail vehicle. For example, the vehicle frame system includes first and second guide wheels that may be used to control movement, or control a direction of movement of the hybrid vehicle as the hybrid vehicle moves along a railway track. The position of the first and second guide wheels may be changed such that the first and second guide wheels may be in direct contact with the railway track while the vehicle frame system is in the first state. Alternatively, the position of the first and second guide wheels may be changed such that the first and second guide wheels may not be in contact with, or may be separated from a non-rail route while the vehicle frame system is in the second state.

The vehicle frame system may include one or more components that may be manufactured of aluminum alloys, and one or more other components that may be manufactured of steel alloys. In order to control an amount of wear between dissimilar materials, the vehicle frame system may include sleeves disposed at mating locations of the dissimilar materials of the vehicle frame system.

At step 1002, a temperature of a material of a sleeve may be controlled to change one or more characteristics of the material of the sleeve. In one embodiment, the temperature of the sleeve may be increased to a predetermined temperature threshold to change the characteristics of the material. For example, increasing the temperature of the sleeve may increase a size of the sleeve. Optionally, the temperature of the sleeve may be decreased to a different predetermined temperature threshold to change the characteristics of the material. For example, decreasing the temperature of the sleeve may decrease the size of the sleeve. The size of the sleeve may be increased to allow the sleeve to slide or move onto a mating component. Alternatively, the size of the sleeve may be decreased to allow the sleeve to be positioned within a mating component.

At step 1004, the sleeve at the changed temperature is moved to an assembly position. The sleeve may be moved into and/or onto another component of the vehicle frame system, where the other component of the vehicle frame system may be manufactured of a non-steel material, such as, but not limited to, an aluminum alloy. In one embodiment, a size of the sleeve may be changed to allow the sleeve to move to a position over an external surface of the other component (e.g., the frame bar of the vehicle frame system). In another embodiment, a size of the sleeve may be changed to allow the sleeve to move to a position within the other component such that an external surface of the sleeve is coupled with an internal surface of the other component (e.g., the guide tube of the vehicle frame system).

At step 1006, the temperature of the material of the sleeve is again controlled to change the temperature of the sleeve. The temperature may be decreased or be reduced to a reduced temperature, such as an ambient temperature. Decreasing the temperature of the sleeve changes the one or more characteristics of the material of the sleeve. For example, decreasing the temperature of the sleeve may decrease a size of the sleeve. Alternatively, increasing the temperature of the sleeve may increase the size of the sleeve. Responsive to the change in characteristics of the material of the sleeve, the sleeve is prohibited from moving out or away from the assembly position. For example, changing the characteristics of the material provides an interference fit between the sleeve and the other component to which the sleeve is assembled with. In one embodiment, the interference fit between the sleeve and the other component may be temperature shrink fit.

In one or more embodiments, a vehicle frame system includes a lower cross frame assembly that is coupled with an axle and includes a frame bar extending between a first end and a second end along a first axis. The frame bar includes a first external circumferential surface extending along at least a portion of the first axis. A first sleeve is configured to be disposed over the first external circumferential surface. A first internal surface of the first sleeve is operably coupled with the first external circumferential surface of the frame bar. The first sleeve is configured for a temperature of the first sleeve to be controlled to change one or more characteristics of the first sleeve. The first sleeve is prohibited from moving relative to the frame bar responsive to changing the one or more characteristics of the first sleeve.

In another aspect, a part (e.g., the first sleeve) may be configured for a temperature of the part to be controlled to change one or more characteristics of the part, in that changing the temperature of the part from a first temperature to a different, second temperature causes one or more dimensions of the part to change, which allows the part to be assembled to another part, and when the temperature of the part is changed from the second temperature to the first temperature the one or more dimensions transition back towards, but not necessarily reaching, their previous state before the temperature was changed from the first temperature to the second temperature, to cause an interference fit between the part and the other part.

Optionally, the vehicle frame system may include a guide assembly operably coupled with the lower cross frame assembly. The guide assembly may include a guide tube extending between a first end and a second end along a second axis, and a second sleeve disposed within a portion of the guide tube. The second sleeve is configured for a temperature of the second sleeve to be controlled to change one or more characteristics of the second sleeve. The second sleeve is prohibited from moving relative to the guide tube responsive to changing the one or more characteristics of the second sleeve.

Optionally, the guide assembly is a first guide assembly, and the vehicle frame system may include a second guide assembly. The first guide assembly is operably coupled with the first end of the frame bar of the lower cross frame assembly, and the second guide assembly is operably coupled with the second end of the frame bar of the lower cross frame assembly.

Optionally, the lower cross frame assembly may include a first end plate disposed at the first end of the frame bar and a second end plate disposed at the second end of the frame bar. The first end plate is operably coupled with the first guide assembly and the first end of the frame bar, and the second end plate is operably coupled with the second guide assembly and the second end of the frame bar.

Optionally, the first end plate and the second end plate are manufactured of an aluminum alloy.

Optionally, the frame bar may be manufactured of an aluminum alloy, and the first sleeve may be manufactured of a steel alloy.

Optionally, the vehicle frame system may include an actuator device operably coupled with the lower cross frame assembly. The actuator device may control movement of the axle between different states of the axle relative to the lower cross frame assembly.

Optionally, the vehicle frame system may be disposed onboard a hybrid vehicle system that is configured to operate as a rail vehicle responsive to the axle being in a first state of the different states, and the hybrid vehicle may operate as a non-rail vehicle responsive to the axle being in a second state of the different states.

Optionally, the actuator device may be a linear actuator device or a hydraulic cylinder actuator device.

Optionally, the axle may be manufactured of an aluminum alloy.

Optionally, the axle may be operably coupled with a first guide wheel disposed at the first end of the axle, and a second guide wheel disposed at the second end of the axle.

Optionally, the vehicle frame system may include one or more springs disposed between the frame bar of the lower cross frame assembly and the axle. The one or more springs may allow movement of the axle relative to the frame bar of the lower cross frame assembly.

In one or more embodiments, a vehicle frame system includes an axle extending between a first end and a second end, a first guide wheel operably coupled with the first end of the axle, and a second guide wheel operably coupled with the second end of the axle. A lower cross frame assembly is operably coupled with the axle and includes a frame bar extending between a first end and a second end of the frame bar along a first axis. A first sleeve and a second sleeve are respectively disposed over the first end and the second end of the frame bar. A first guide assembly is operably coupled with the first end of the frame bar and a second guide assembly is operably coupled with the second end of the frame bar. Each of the first and second guide assemblies respectively comprising a guide tube extending between a first end and a second end along a second axis, and a third sleeve disposed within a portion of the guide tube. The first and second sleeves are interference fit with the frame bar and the third sleeve is interference fit within the guide tube so that the first and second sleeves are prohibited from moving relative to the frame bar and the third sleeve is prohibited from moving relative to the guide tube.

Optionally, the interference fit of the first and second sleeves with the frame bar and the interference fit of the third sleeve within the guide tube are each a temperature shrink fit.

Optionally, the axle, the frame bar, and the guide tubes of the first and second guide assemblies may be manufactured of an aluminum alloy, and the first, second, and third sleeves may be manufactured of a steel alloy.

Optionally, the vehicle frame system may include an actuator device operably coupled with the lower cross frame assembly, and may control movement of the axle between different states of the axle relative to the lower cross frame assembly.

Optionally, the vehicle frame system may be disposed onboard a hybrid vehicle system configured to operate as a rail vehicle responsive to the axle being in a first state of the different states, and configured to operate as a non-rail vehicle responsive to the axle being in a second state of the different states.

Optionally, the actuator device may be a linear actuator device or a hydraulic cylinder actuator device.

Optionally, the vehicle frame system may include plural springs disposed between the frame bar of the lower cross frame assembly and the axle. The plural springs may allow movement of the axle relative to the frame bar of the lower cross frame assembly in a direction toward the frame bar or in a direction away from the frame bar.

In one or more embodiments, a railgear for a hi-rail vehicle includes an axle extending between a first end and a second end. A first guide wheel is operably coupled with the first end of the axle, and a second guide wheel is operably coupled with the second end of the axle. A lower cross frame assembly is operably coupled with the axle and include a frame bar extending between a first end and a second end along a first axis. A first sleeve is disposed over the first end of the frame bar and a second sleeve is disposed over the second end of the frame bar. An actuator device is operably coupled with the lower cross frame assembly and controls movement of the axle between different states of the axle relative to the lower cross frame assembly. The railgear includes first and second guide assemblies operably coupled with the first and second ends of the frame bar. Each of the first and second guide assemblies respectively comprising a guide tube extending between a first end and a second end along a second axis, and a third sleeve disposed within a portion of the guide tube. The first sleeve and the second sleeve are interference fit on to the first and second ends of the frame bar, respectively, and the third sleeve of each of the first and second guide assemblies is interference fit within the guide tube, so that the first and second sleeves and the third sleeve are prohibited from moving relative to the frame bar and the guide tube, respectively.

Optionally, the interference fit between the first and second sleeves and the frame bar, and the interference fit of the third sleeve within the guide tube are each a temperature shrink fit.

Optionally, the axle, the frame bar, and the guide tubes of the first and second guide assemblies may be manufactured of an aluminum alloy, and the first, second, and third sleeves may be manufactured of a steel alloy.

Optionally, a hi-rail vehicle may include the railgear, and the hi-rail vehicle may operate as a rail vehicle responsive to the axle being in a first state of the different states, and the hi-rail vehicle system may operate as a non-rail vehicle responsive to the axle being in the second state of the different states.

In one embodiment, the controllers or systems described herein may have a local data collection system deployed and may use machine learning to enable derivation-based learning outcomes. The controllers may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. In examples, the tasks may be machine learning problems such as classification, regression, clustering, density estimation, dimensionality reduction, anomaly detection, and the like. In examples, machine learning may include a plurality of mathematical and statistical techniques. In examples, the many types of machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used making determinations, calculations, comparisons and behavior analytics, and the like.

In one embodiment, the controllers may include a policy engine that may apply one or more policies. These policies may be based at least in part on characteristics of a given item of equipment or environment. With respect to control policies, a neural network can receive input of a number of environmental and task-related parameters. These parameters may include, for example, operational input regarding operating equipment, data from various sensors, location and/or position data, and the like. The neural network can be trained to generate an output based on these inputs, with the output representing an action or sequence of actions that the equipment or system should take to accomplish the goal of the operation. During operation of one embodiment, a determination can occur by processing the inputs through the parameters of the neural network to generate a value at the output node designating that action as the desired action. This action may translate into a signal that causes the vehicle to operate. This may be accomplished via back-propagation, feed forward processes, closed loop feedback, or open loop feedback. Alternatively, rather than using backpropagation, the machine learning system of the controller may use evolution strategies techniques to tune various parameters of the artificial neural network. The controller may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models are obtained, they may be evaluated on their performance using a determined success metric. The best model is selected, and the vehicle controller executes that plan to achieve the desired input data to mirror the predicted best outcome scenario. Additionally, the success metric may be a combination of the optimized outcomes, which may be weighed relative to each other.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

As used herein, an element or step recited in the singular and proceeded with the word "a" or "an" do not exclude the plural of said elements or operations, unless such exclusion is explicitly stated. Furthermore, references to "one embodiment" of the invention do not exclude the existence of additional embodiments that incorporate the recited features. Moreover, unless explicitly stated to the contrary, embodiments "comprising," "comprises," "including," "includes," "having," or "has" an element or a plurality of elements having a particular property may include additional such elements not having that property. In the appended claims, the terms "including" and "in which" are used as the plain-English equivalents of the respective terms "comprising" and "wherein." Moreover, in the following clauses, the terms "first," "second," and "third," etc. are used merely as labels, and do not impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function devoid of further structure.

The above description is illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein define the parameters of the inventive subject matter, they are exemplary embodiments. Other embodiments will be apparent to one of ordinary skill in the art upon reviewing the above description. The scope of the inventive subject matter should, therefore, be determined with reference to the appended claims, along with the full scope of equivalents to which such clauses are entitled.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A vehicle frame system comprising:
a lower cross frame assembly configured to be coupled with an axle, the lower cross frame assembly comprising:
a frame bar extending between a first end and a second end of the frame bar along a first axis, the frame bar having a first external circumferential surface extending along at least a portion of the first axis; and
a first sleeve configured to be disposed over the first external circumferential surface, wherein a first internal surface of the first sleeve is configured to be operably coupled with the first external circumferential surface of the frame bar;
wherein the first sleeve is configured for a temperature of the first sleeve to be controlled to change one or more characteristics of the first sleeve, wherein the first sleeve is prohibited from moving relative to the frame bar responsive to changing the one or more characteristics of the first sleeve; and
a guide assembly operably coupled with the lower cross frame assembly, the guide assembly comprising:
a guide tube extending between a first end and a second end of the guide tube along a second axis; and
a second sleeve configured to be disposed within a portion of the guide tube, wherein the second sleeve is configured for a temperature of the second sleeve to be controlled to change one or more characteristics of the second sleeve, wherein the second sleeve is prohibited from moving relative to the guide tube responsive to changing the one or more characteristics of the second sleeve.

2. The vehicle frame system of claim 1, wherein the guide assembly is a first guide assembly, the vehicle frame system further comprising a second guide assembly, wherein the first guide assembly is configured to be coupled with the first end of the frame bar of the lower cross frame assembly, and the second guide assembly is configured to be coupled with the second end of the frame bar of the lower cross frame assembly.

3. The vehicle frame system of claim 2, the lower cross frame assembly further comprising a first end plate disposed at the first end of the frame bar and a second end plate disposed at the second end of the frame bar, wherein the first end plate is operably coupled with the first guide assembly and the first end of the frame bar, and the second end plate is operably coupled with the second guide assembly and the second end of the frame bar.

4. The vehicle frame system of claim 3, wherein the first end plate and the second end plate are manufactured of an aluminum alloy.

5. The vehicle frame system of claim 1, wherein the frame bar is manufactured of an aluminum alloy, the axle is manufactured of an aluminum alloy, and the first sleeve is manufactured of a steel alloy.

6. The vehicle frame system of claim 1, further comprising:
an upper cross frame assembly coupled to the lower cross frame assembly;
an actuator device operably coupled with the lower cross frame assembly, and configured to control movement of the axle between different states of the axle relative to the upper cross frame assembly.

7. The vehicle frame system of claim 6, wherein vehicle frame system is disposed onboard a hybrid vehicle system, the hybrid vehicle system configured to operate as a rail vehicle responsive to the axle being in a first state of the different states, and the hybrid vehicle system is configured to operate as a non-rail vehicle responsive to the axle being in a second state of the different states.

8. The vehicle frame system of claim 6, wherein the actuator device is a linear actuator device or a hydraulic cylinder actuator device.

9. The vehicle frame system of claim 1, wherein the axle is operably coupled with a first guide wheel disposed at the first end of the axle and a second guide wheel disposed at the second end of the axle.

10. The vehicle frame system of claim 1, further comprising one or more springs disposed between the frame bar of the lower cross frame assembly and the axle, the one or more springs configured to allow movement of the axle relative to the frame bar of the lower cross frame assembly.

11. A vehicle frame system comprising:
an axle extending between a first end and a second end, a first guide wheel operably coupled with the first end of the axle and a second guide wheel operably coupled with the second end of the axle;
a lower cross frame assembly operably coupled with the axle, the lower cross frame assembly comprising:
a frame bar extending between a first end and a second end of the frame bar along a first axis; and
a first sleeve and a second sleeve respectively disposed over the first end and the second end of the frame bar; and
a first guide assembly operably coupled with the first end of the frame bar and a second guide assembly operably coupled with the second end of the frame bar, each of the first and second guide assemblies respectively comprising:
a guide tube extending between a first end and a second end of the guide tube along a second axis; and
a third sleeve disposed within a portion of the guide tube, wherein the first and second sleeves are interference fit with the frame bar and the third sleeve is interference fit within the guide tube so that the first and second sleeves are prohibited from moving relative to the frame bar and the third sleeve is prohibited from moving relative to the guide tube.

12. The vehicle frame system of claim 11, wherein the interference fit of the first and second sleeves with the frame bar and the interference fit of the third sleeve within the guide tube are each a temperature shrink fit.

13. The vehicle frame system of claim 11, wherein the axle, the frame bar, and the guide tubes of the first and second guide assemblies are manufactured of an aluminum alloy, and the first, second, and third sleeves are manufactured of a steel alloy.

14. The vehicle frame system of claim 11, further comprising:
an upper cross frame assembly coupled to the lower cross frame assembly;
an actuator device operably coupled with the lower cross frame assembly, and configured to control movement of the axle between different states of the axle relative to the upper cross frame assembly.

15. The vehicle frame system of claim 14, wherein the vehicle frame system is disposed onboard a hybrid vehicle system configured to operate as a rail vehicle responsive to the axle being in a first state of the different states, and the hybrid vehicle system is configured to operate as a non-rail vehicle responsive to the axle being in a second state of the different states.

16. The vehicle frame system of claim 14, wherein the actuator device is a linear actuator device or a hydraulic cylinder actuator device.

17. The vehicle frame system of claim 11, further comprising plural springs disposed between the frame bar of the lower cross frame assembly and the axle, the plural springs configured to allow movement of the axle relative to the frame bar of the lower cross frame assembly in a direction toward the frame bar or in a direction away from the frame bar.

18. A railgear for a hi-rail vehicle comprising:
an axle extending between a first end and a second end, a first guide wheel operably coupled with the first end of the axle and a second guide wheel operably coupled with the second end of the axle;
a lower cross frame assembly operably coupled with the axle, the lower cross frame assembly comprising a frame bar extending between a first end and a second end of the frame bar along a first axis, a first sleeve disposed over the first end of the frame bar and a second sleeve disposed over the second end of the frame bar;
an upper cross frame assembly, wherein the lower cross frame assembly is rotatable relative to upper cross frame assembly about the first axis;
an actuator device operably coupled with the lower cross frame assembly and configured to control movement of the axle between different states of the axle by rotating the lower cross frame assembly relative to the upper cross frame assembly; and
first and second guide assemblies operably coupled with the first and second ends of the frame bar, each of the first and second guide assemblies respectively comprising a guide tube extending between a first end and a second end of the guide tube along a second axis and a third sleeve disposed within a portion of the guide tube,
wherein the first sleeve and the second sleeve are interference fit on to the first and second ends of the frame bar respectively, and the third sleeve of each of the first and second guide assemblies is interference fit within the guide tube, so that the first and second sleeves and the third sleeve are prohibited from moving relative to the frame bar and the guide tube, respectively.

19. A hi-rail vehicle comprising the railgear of claim 18, wherein the hi-rail vehicle is configured to operate as a rail vehicle responsive to the axle being in a first state of the different states, and the hi-rail vehicle is configured to operate as a non-rail vehicle responsive to the axle being in a second state of the different states.

* * * * *